Aug. 19, 1969 R. HOFFMANN 3,461,581

PLASTIC CARD AND METHOD OF MAKING SAME

Filed April 10, 1967

INVENTOR.
ROBERT HOFFMANN

BY Hill, Sherman, Meroni, Gross & Simpson

ATTORNEYS

United States Patent Office 3,461,581
Patented Aug. 19, 1969

3,461,581
PLASTIC CARD AND METHOD OF MAKING SAME

Robert Hoffmann, Chicago, Ill., assignor to Placard-Chicago Corporation, Chicago, Ill., a corporation of Illinois Filed Apr. 10, 1967, Ser. No. 629,803
Int. Cl. G09f 3/02
U.S. Cl. 40—2.2 11 Claims

ABSTRACT OF THE DISCLOSURE

The illustrated card is made by printing on first thermoplastic sheets an array of identical indicia representing the format for each of a group of cards, and by causing a computer to print out on a web of second transparent thermoplastic sheets individual data for the respective cards arranged so that each data location on the second sheet will register with a format location on the first sheet. After thermoplastic cover sheets are applied to outer printed surfaces of the superimposed first and second sheets, the sheets are fused together and then severed into individual card units.

Background of the invention

In one type of card now in use individual data must be in the form of embossments so as to mechanically cooperate with a receiving device. An example is the familiar credit card where an individual identifying number is embossed on each card so as to be conveniently mechanically transferred to the records of each transaction involving the card holder.

A different type of card is exemplified by the various identification cards which are required primarily for visual inspection, and may not be required to perform any mechanical function.

Heretofore any purely visual data related to an individual card has generally been entered on the surface of the card bearing the format indicia, where the individual data has been inserted during the card manufacturing process.

Summary of the invention

It is an object of the present invention to provide an improved plastic card and an improved method of making a group of plastic cards which are to have respective individual data associated with common format indicia.

Another object of the invention is to provide an economical method for making individual plastic identification cards and the like.

Still another object of the invention resides in a plastic card and method of making the same wherein format indicia and individual data may be entered during manufacture with great accuracy and speed.

A further object of the invention relates to a method of inserting individual data on a group of cards which lends itself to complete mechanization.

Other objects, features and advantages of the present invention will be apparent from the following detailed description taken in connection with the accompanying drawing.

Description of the preferred embodiment

Figures 1, 2, 3, 4, 5, 6:
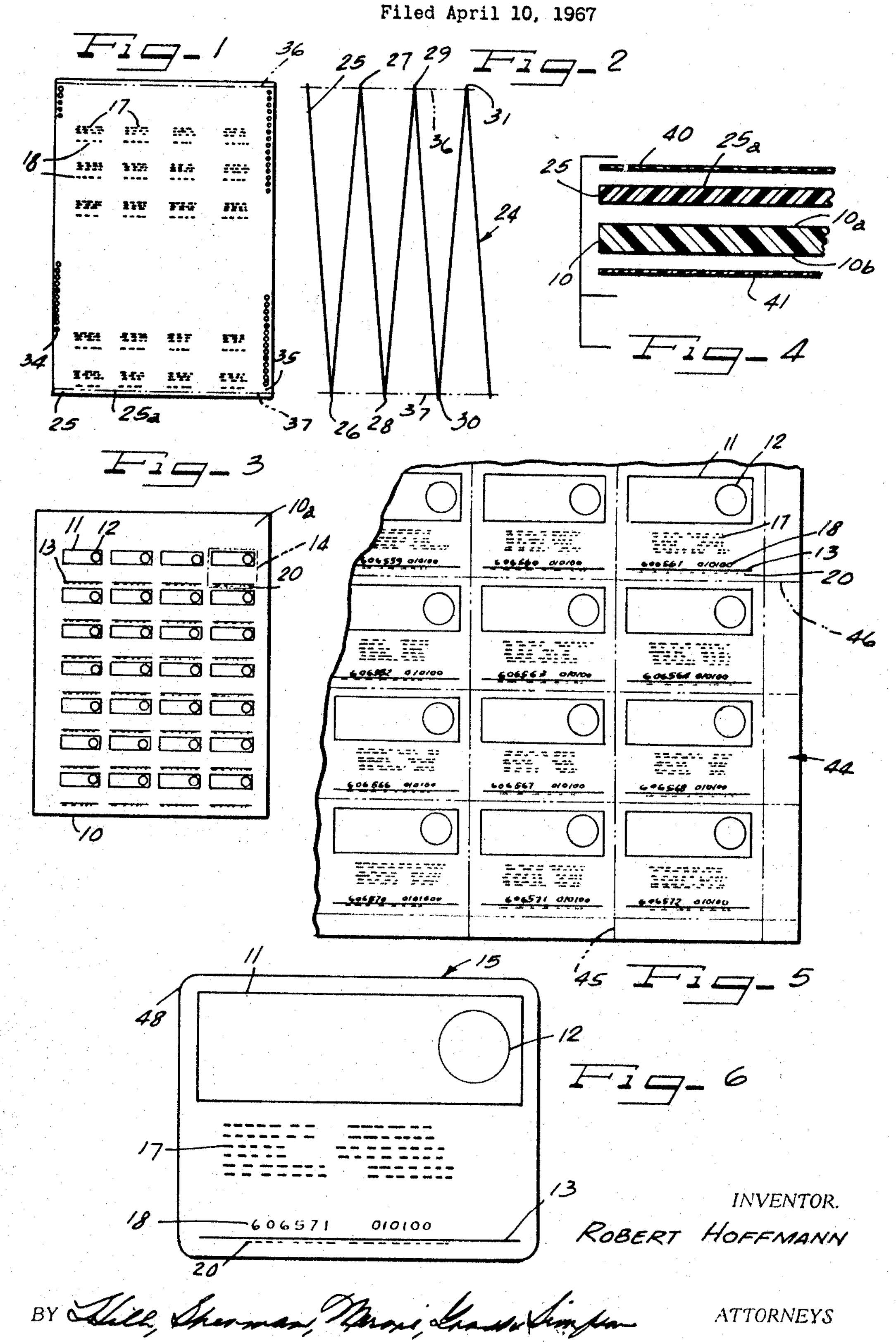
FIG. 1 is a somewhat diagrammatic side elevational view showing one sheet of a web of sheets connected together on successive fold lines.
FIG. 2 is a diagrammatic partial end view of the web of FIG. 1.
FIG. 3 is a somewhat diagrammatic side elevational view of a thermoplastic sheet having format indicia printed thereon.
FIG. 4 is a diagrammatic partial sectional view indicating the sheet of FIG. 3 registered with one sheet of the web of FIGS. 1 and 2 and associated transparent cover sheets which are assembled to form a composite unit.
FIG. 5 is a somewhat diagrammatic partial elevational view of the composite unit formed from the superimposed sheets illustrated in FIG. 4.
FIG. 6 is an elevational view of a single card as severed from the composite unit of FIG. 5.

FIG. 3 illustrates a first sheet 10 of thermoplastic material having a surface **10*a* on which is printed an array of format indicia. Simply for the purpose of illustration, the format indicia have been shown as comprising a rectangle 11 with a circle 12 therein at the right hand side and a horizontal line 13 extending parallel to the long sides of the rectangle 11** and spaced therebelow.

The format indicia 11–13 are disposed at each of a series of locations such as that indicated by the dash rectangle 14 and corresponding in size to the size of a finished card such as indicated at 15 in FIG. 6. Preferably the locations 14 are arranged in closely spaced rows along the length of the surface **10*a* so as to efficiently utilize the surface area of the sheet 10. Further, the rows and columns of format indicia 11–13 are preferably uniformly and rectilinearly arranged so as to facilitate the production of individual data which is to cooperate with the indicia 11–13. Referring to the card 15 of FIG. 6, the reference numerals 11–13 designate the format indicia on the card 15 corresponding to the format indicia printed on sheet 10. The individual data on the card 15 may, for example, consist of a name and address located as indicated at 17 in FIG. 6 and an identifying number as indicated at 18 in FIG. 6. As indicated in FIG. 6, it is desired that the individual data 17 appear in the space between the rectangle 11 and the line 13, and it is desired that the identifying number 18 appear directly over the line 13. A further format notation such as "Account Number" may appear at a location such as indicated at 20 in FIGS. 3 and 5. Thus, the individual data 17 and 18 is to be precisely positioned relative to the format indicia 11–13**, and the format indicia and individual data cooperate in conveying the total information desired in response to visual inspection of the card.

FIGS. 1 and 2 illustrate a web 24 comprising a series of second sheets 25 of transparent thermoplastic material connected by successive fold lines such as indicated at 26–31, so that the web 24 can be folded into a compact rectilinear mass having a height dimension closely approximating the sum of the thicknesses of the successive sheets 25. The web 24 has series of feed holes 34 and 35 at the respective lateral margins and uniformly spaced along the entire length of the web.

The web 24 is of thickness and of other characteristics so as to be reliably utilized in the print out equipment of a conventional digital computer such as the IBM 1401. The conventional computer is programmed to print onto the web 24 line by line the desired individual data such as indicated at 17 and 18 for each of a large group of individuals. The computer is so programmed that the arrangement and spacing of the individul data 17, 18 on surface **25*a* of each sheet 25 is capable of being registered with the printed format indicia of one of the sheets 10. Thus, the spacing of the successive rows of individual data 17, 18 corresponds to the spacing of the rows of format locations 14, and the spacing of the columns of individual data such as 17, 18 corresponds to the spacing of the columns of format locations 14 on the sheet 10. Accordingly, when the web 24 is severed into individual sheets as represented by dash lines 36 and 37 in FIG. 2, the individual transparent sheets 25 may be superimposed over the format sheets 10** to give the composite appearance shown in FIG. 5.

Where as in the exemplary embodiment, the computer print out data 17, 18 appears on an outer surface 25*a* as viewed in FIG. 4, a cover sheet of transparent thermoplastic material designated by the reference numeral 40 is superimposed on the surface 25*a*. Similarly since printed matter may appear on the outer surface 10*b* of sheet 10, a cover sheet 41 is applied over this surface which is also of transparent thermoplastic material. The superimposed sheets 40, 25, 10, 41 are then subjected to suitable heat and pressure so as to fuse the sheets into a composite sheet such as designated by the reference numeral 44 in FIG. 5. Thus the composite sheet 44 will have an upper layer provided by the material of cover sheet 40, a second layer provided by the material of sheet 25, a third layer provided by the material of sheet 10, and a bottom layer provided by the material of cover sheet 41.

The composite sheet 44 may then be severed into individual cards such as indicated at 15 by severing the sheet 44 as generally indicated by vertical dot dash lines 45 and horizontal dot dash lines 46. The severing operation preferably forms cards such as indicated at 15 with rounded edges such as indicated at 48 without requiring any further finishing operation on the cards.

It will be appreciated that preferably the individual cards such as formed from the composite sheet 44 of FIG. 5 will each have diffeernt individual data thereon based on the individual data printed on the sheet by the computer. Since the format sheets 10 and the computer print-out sheets 25 can be individually checked prior to shipment to a common point for assembly, much lost motion and wastage of material is eliminated. Further, the operation can be carried out on a fully automatic basis.

By way of example only and not of limitation, a specific embodiment of the invention will now be described. In this embodiment the first sheets 10 were white opaque calendered polyvinyl chloride thermoplastic sheeting having a thickness of eight mils (1 mil=.001 inch) and provided with a printing surface equivalent to Union Carbide Corporation's "Matte 04." The sheets were approximately 17 inches wide and 21½ inches long and had format indicia such as 11–13 and 20 printed thereon by conventional offset printing at four format locations in a row across the width, and at seven format locations in each column substantially as shown in FIG. 3. The web 24 was formed of clear transparent calendered polyvinyl chloride thermoplastic sheeting having a thickness of five mils and known in the trade as "High Impact Material." Such material for web 24 is available from Tenneco Chemicals, Incorporated, Nixon-Baldwin Division and is identified as "VCR 1001, SS finish," while the material for sheets 10 is available from the same source under the identification "VCH 5006, SS finish." The cover sheets 40 and 41 were of clear transparent calendered polyvinyl chloride thermoplastic sheeting having a thickness of one mil, and available from the above named source under the designation "NLOC 800." The individual panels or sheets 25 of web 24 and the cover sheets 40 and 41 had approximately the same length and width as the sheets 10. The respective holes of series 34 and 35 were transversely aligned and had a longitudinal spacing of about ½ inch along the entire length of the web 24. The corresponding holes of successive sheets 25 were aligned in the direction through the sheets when the sheets were folded into a flat rectilinear stack. The fold lines such as 26–31 in web 24 were perforated so that the sheets 25 could be manually separated; however actually the sheets 25 were folded into a flat rectilinear stack after computer print-out thereon, and the stack was then cut just inside of fold lines such as 27, 29, 31 as indicated at 36 in FIG. 1, and just inside of fold lines such as 26, 28, 30 as indicated at 37 in FIG. 1 to "burst" or separate the individual sheets 25. The ribbon used in the IBM 1401 computer print-out apparatus was a Mylar ribbon available from Columbia Ribbon and Carbon Manufacturing Company, Chicago, Ill. under the identification "SF-100" and having an intense liquid solvent ink. The size of the ribbon was 14 inches wide and 45 yards long to fit the IBM 1401 print-out apparatus. This ribbon gave a very clear and sharp print-out without smudging, and resulted in an extremely legible and attractive card. The individual cards were about 2½ inches by 3¼ inches and had a thickness of about 0.15 inch, so as to be extremely flexible, and extremely durable.

The term computer print-out data is intended to cover data printed out in an automatic manner in accordance with a previously established program, and of course is not limited to an on-line print-out from a general purpose digital computer.

It will be apparent that many modifications and variations may be effected without departing from the scope of the novel concepts of the present invention.

For the specific example given above, the procedure might involve supplying a computer with program instructions on punched cards or the like directing the computer to read name and address and account number information from magnetic tape, for example, for print-out as indicated in FIG. 1. Thus the computer might read and store four successive name and address and account number entries from the magnetic tape, and then control a print-out device to enter a first line with the respective names and spaced as in FIG. 1. Thereafter the web 24 would be automatically indexed one lone, and a line of address information would be printed under each name. The web 24 would be indexed one more line for the last line of the address, and then the web 24 might be automatically indexed in accordance with the stored program in the computer, a distance corresponding to three lines before the line of account numbers 18 was printed out. The web 24 would then be indexed a distance determined by the stored program before the print-out of further lines of individual data was initiated. The foregoing procedure is given by way of example only, and not of limitation.

I claim as my invention:

1. As an article of manufacture, a plastic card comprising a first layer of plastic material having an information bearing surface with printed indicia thereon consisting essentially of general information applicable to a group of such cards, and a second layer of plastic material disposed in substantially coextensive parallel relation to said first layer and having an information bearing surface with computer print-out data thereon specific to the individual card, the computer print-out data being registered relative to the printed indicia of the first layer so as to cooperate in conveying intelligence upon inspection of the card.

2. The article of claim 1 with said first and second layers being directly fused together and with at least one information bearing surface sealed therebetween.

3. The article of claim 2 with the second layer being of transparent material and superimposed on the first layer, and having said information bearing surface thereof remote from said first layer, and with a cover layer of thermoplastic material overlying the information bearing surface of said second layer and fused with said second layer.

4. The article of claim 1 with said plastic card being essentially entirely free of adhesive formulations and being formed entirely of thermoplastic layers fused together.

5. The method of making a group of plastic cards bearing first common information common to all of the cards and bearing second individual items of information individual to the respective cards of the group which comprises:

printing the first information at a multiplicity of discrete first locations on each of a series of first sheets of plastic material, automatically printing out respective second individual items of information at discrete locations across the width of successive folded sheets of a web of plastic material, registering the folded sheets with respective first sheets with the second individual items of information registering with the respective first information at respective first locations, and securing the registered sheets together and severing the sheets into individual cards each containing the first common information and second individual items of information registered therewith.

6. As an article of manufacture, a plastic card comprising a first layer of synthetic resin material having an information bearing surface with printed indicia thereon consisting essentially of generally information applicable to a group of such cards, a second layer of synthetic resin material secured with said first layer and having an information bearing surface with automatic print-out data thereon specific to the individual card, the automatic print-out data being registered relative to the printed indicia of the first layer so as to cooperate in conveying intelligence upon inspection of the card.

7. As an article of manufacture, a plastic card to be carried by an individual comprising a first layer of thermoplastic material having an information bearing surface with indicia thereon consisting essentially of general information applicable to a group of such cards which are to be carried by respective different persons, and a second layer of thermoplastic material having a thickness of not more than about five mils and disposed in substantially coextensive parallel relation to said first layer and having an information bearing surface with automatically composed data thereon specific to the individual card, the automatically composed data being registered relative to the indicia of the first layer so as to cooperate in conveying intelligence upon inspection of the card, said first and second layers being components of a unitary fused assembly and said assembly sealing the information bearing surfaces of said layers against defacing contact.

8. The article of claim 7 with said first and second layers being directly fused together and with at least one information bearing surface sealed therebetween.

9. The article of claim 7 with the second layer being of transparent material and superimposed on the first layer and with a cover layer of thermoplastic material fused to the outer surface of the second layer.

10. The article of claim 7 with said plastic card being essentially entirely free of adhesive formulations and being formed entirely of thermoplastic layers fused together.

11. The method of making a group of plastic cards bearing first common information common to all of the cards and bearing second individual items of information individual to the respective cards of the group which comprises:

applying the first information at a multiplicity of discreta first locations on first plastic sheet material, automatically composing respective second individual items of information at discrete second locations on second plastic sheet material with the second locations having a relative spacing and arrangement corresponding to the relative spacing and arrangement of the first locations so as to be registrable therewith upon superposition of the first and second sheet material, superimposing said first and second sheet material so that the second individual items of information at the second locations are uniformly related to the first common information at respective first locations, and securing the superimposed first and second sheet material into a unitary assembly and severing said assembly into individual cards each containing the first common information and second individual items of information related therewith.

References Cited

UNITED STATES PATENTS

| | | | |
|---|---|---|---|
| 2,984,030 | 5/1961 | Hannon | 40—2.2 |
| 3,068,140 | 12/1962 | Biddle | 40—2.2 X |
| 3,152,901 | 10/1964 | Johnson | 40—2.2 X |
| 3,245,697 | 4/1966 | Nugent | 40—2.2 |
| 3,391,479 | 7/1968 | Buzzell | 40—2.2 |

EUGENE R. CAPOZIO, Primary Examiner

W. J. CONTRERAS, Assistant Examiner

U.S. Cl. X.R.

283—7